May 2, 1933.  G. F. McDOUGALL  1,906,987
PIPE WELDING MACHINE
Filed Oct. 6, 1931   5 Sheets-Sheet 1
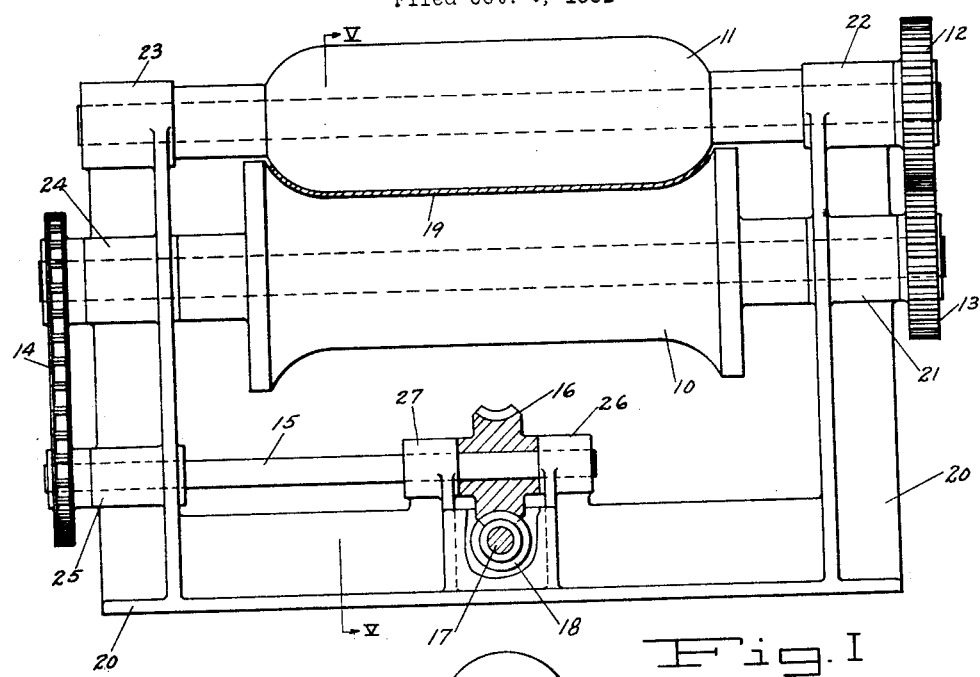
Fig. I
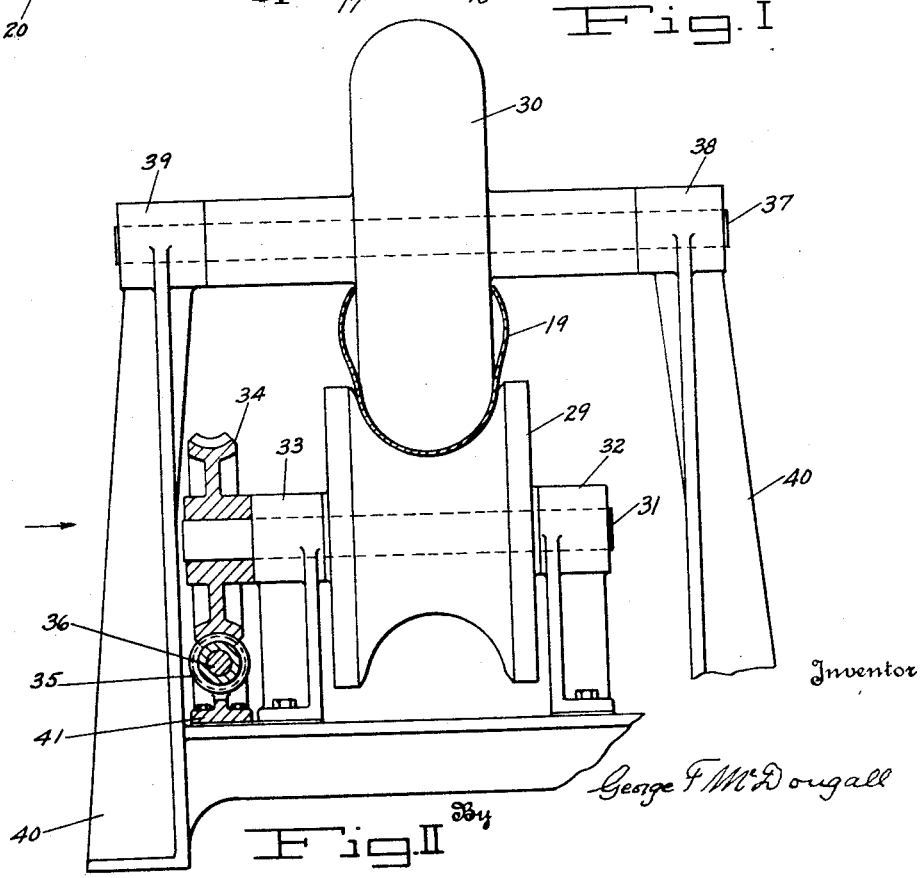
Fig. II
Inventor
George F McDougall
By May 2, 1933.  G. F. McDOUGALL  1,906,987
PIPE WELDING MACHINE
Filed Oct. 6, 1931   5 Sheets-Sheet 2
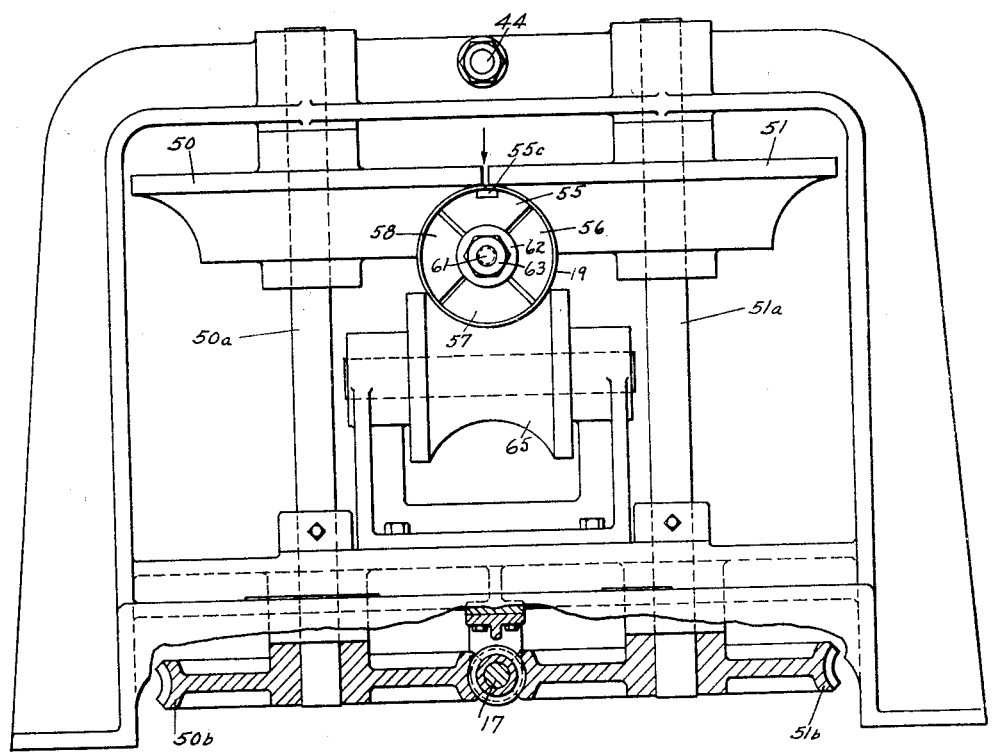
Fig. III
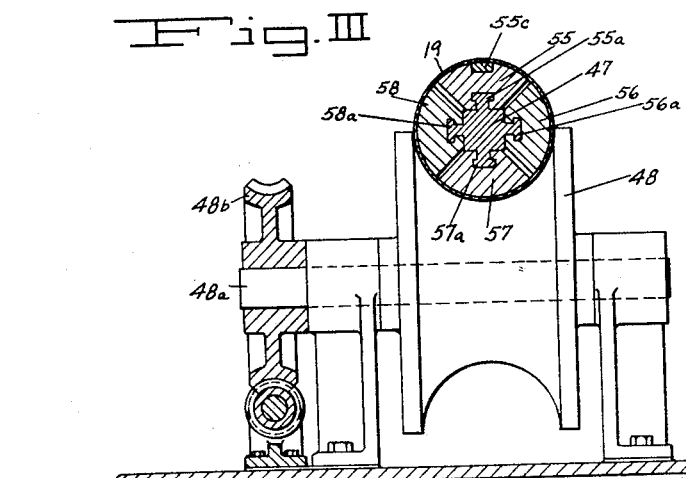
Fig. IV
Inventor
George F. McDougall
By

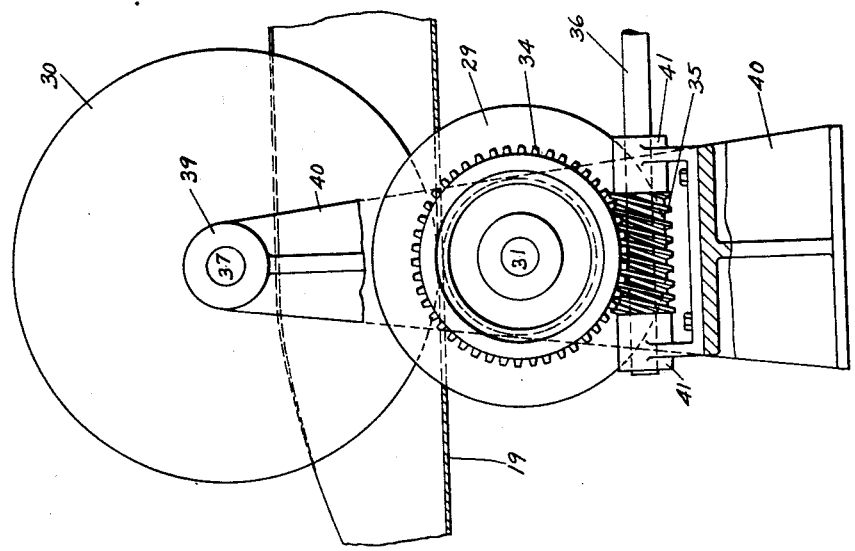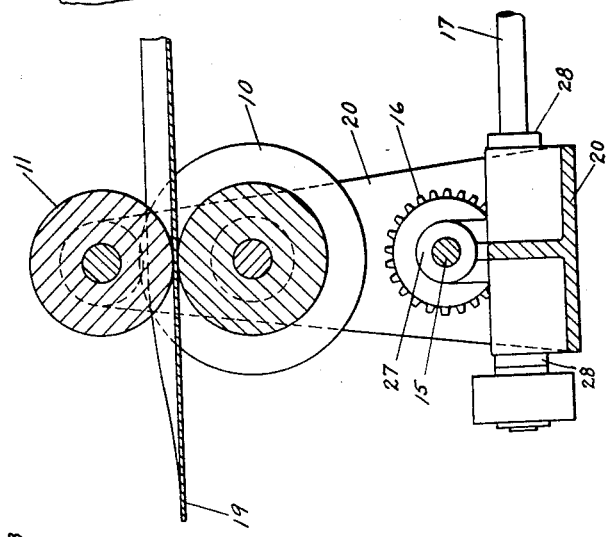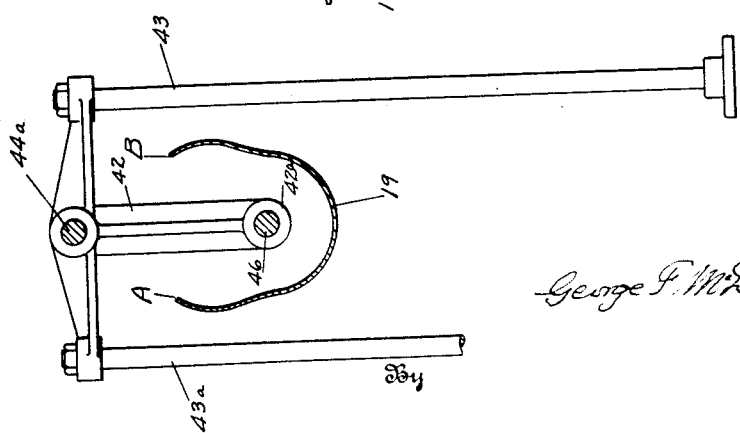

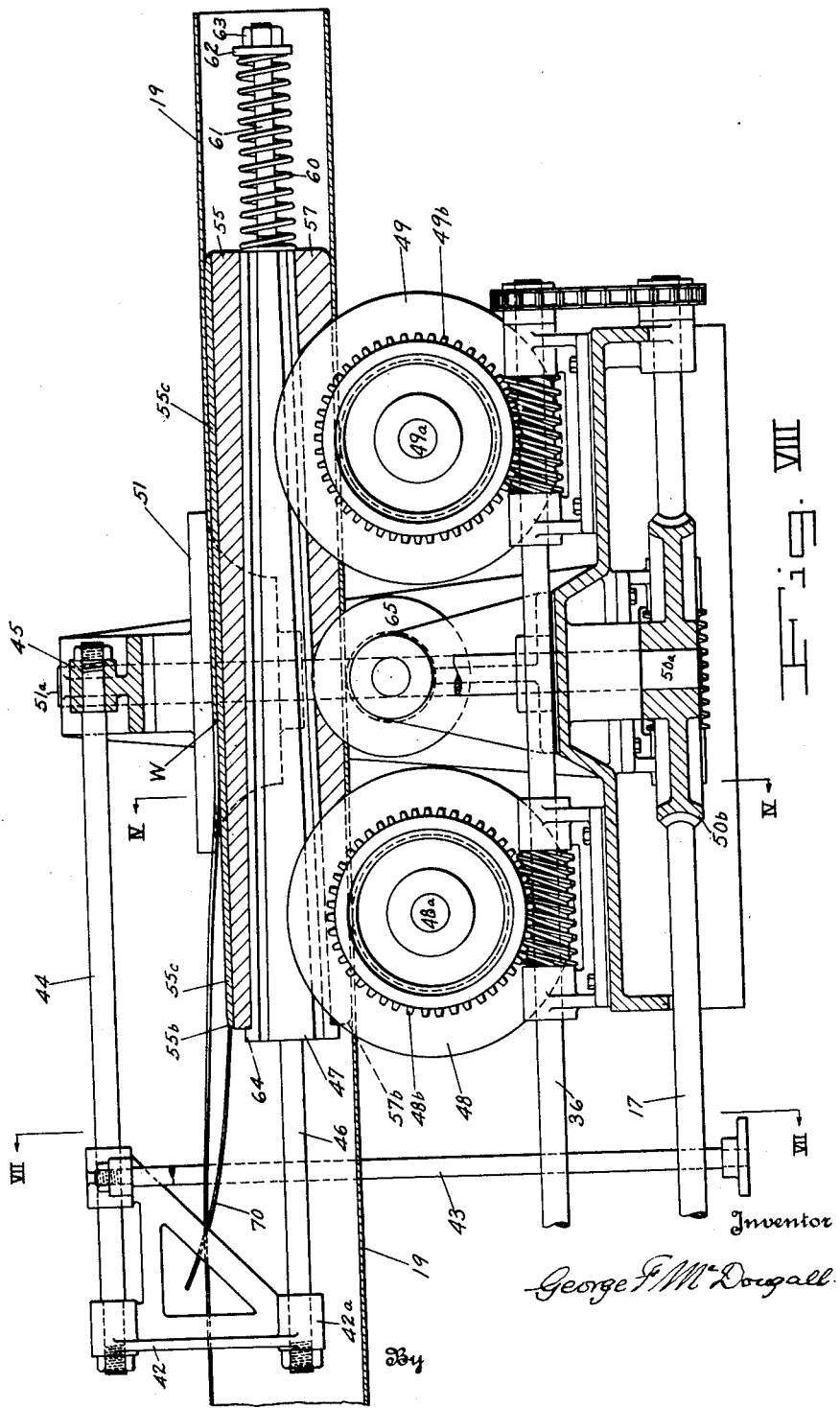

May 2, 1933. G. F. McDOUGALL 1,906,987
PIPE WELDING MACHINE
Filed Oct. 6, 1931 5 Sheets-Sheet 5
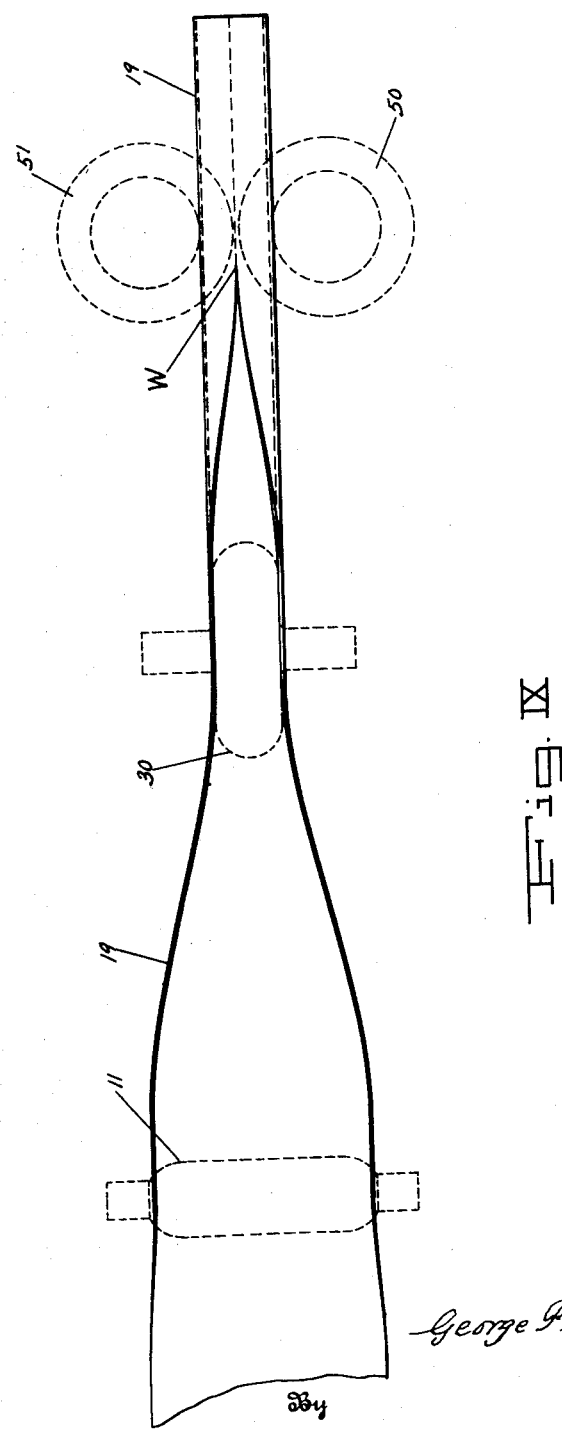
Fig. IX
Inventor
George F. McDougall
By Patented May 2, 1933

1,906,987

UNITED STATES PATENT OFFICE

GEORGE F. McDOUGALL, OF PORTLAND, OREGON, ASSIGNOR OF TWO-THIRDS TO JOHN S. BEALL, OF PORTLAND, OREGON

PIPE WELDING MACHINE

Application filed October 6, 1931. Serial No. 567,213.

My invention pertains to machines adapted to progressively form plates of metal fed into the machine endwise, to a cylindrical outline comprising the shell of a pipe and then welding the edges together into a longitudinal seam to form a pipe.

A principal object of my invention is a means for finishing pipe by what is known as rod-welding means, as distinguished from resistance welding means, hereinafter more particularly differentiated.

Forming a pipe in this manner by machines that use resistance welding is old and it may be done in this manner without the use of a mandrel in ways well known to the art; but it has been heretofore considered impossible to use rod-welding since no means has been heretofore known to weld over a mandrel, and a mandrel is indispensable for a rod-weld.

By rod-welding in this specification is meant that type of autogenous weld, either by the electric arc, acetylene flame or other equivalent method that deposits extra melted metal between two adjacent edges and fuses the excess metal with the adjacent edges to complete a welded closure; and by resistance welding is meant that means that consists of heating two adjacent edges by electric current to a welding heat and squeezing them together by pressure while in a plastic welding condition.

It is not possible to use a long mandrel the length of the pipe to be welded as no means are known to get the mandrel out when the weld is completed; and collapsible mandrels of desirable length for the purpose have been found impracticable since it is desirable, varying somewhat with the diameter of the pipe, to form pipes as much as thirty-six feet long or longer without any girth seams.

Another principal object of my invention is the saving of electric current where electricity is the means used for performing the weld, the electric arc requiring only a small fraction of the current necessary to be used with the resistance weld.

These objects together with those in the specification and claims partly obvious and partly described constitute the purpose of my new invention.

Drawings accompany and are made a part of this specification, being partly diagrammatic as hereinafter pointed out.

In the drawings,—

Fig. I is an end elevation of a first pipe forming stage of my machine adapted to give the initial bend to the edges of a plate destined to become a pipe;

Fig. II is an end view of a second stage adapted to take the partially formed plate as it emerges from the processing shown in Fig. I, and further shape it toward circular outline;

Fig. III is an end view of a third stage of my machine adapted to finish closing the plate into circular outlines and to support welding means, which are not shown, for joining the two edges of the longitudinal seam;

Fig. IV is a section taken at IV—IV of Fig. VIII with some parts omitted;

Fig. V is a section on the line V—V of Fig. I;

Fig. VI is a view partly in section and with parts removed of Fig. II viewed from the direction of the arrow in Fig. II;

Fig. VII is a partial section taken at VII—VII of Fig. VIII;

Fig. VIII (taken in connection with Figs. III and IV) represents what may be called the heart of this invention and it is a view partly in section lengthwise of the machine showing the means co-operating with my new floating mandrel which renders the objects of this invention possible of accomplishment;

Fig. IX is a diagrammatic view showing the three stages of forming the plate into a tube with the several stages indicated in dotted outline.

It will be understood that these several stages of forming the pipe, that is to say particularly the first two of them, are not intended to teach anything in the art, as means for forming a plate longitudinally into the circular outline of a pipe shell are old and well known. Several more stages may be used with advantage where the plate is heavy and instead of there being one machine with three or more separate stages as indicated in Fig. IX the operations may advantageously be performed consecutively on separate independent machines.

In Fig. I a lower roller, 10, and a superposed upper roller, 11, provided with driving means such as the gear, 12 and 13, a chain, 14, a counter-shaft, 15, a worm wheel, 16, and a lay-shaft, 17, upon which is mounted a worm, 18, supplied with power from a source not shown, are shown having between them a plate such as 19 to be made into a pipe. A frame, 20, indicates a support for bearings such as 21, 22, 23, 24, 25, 26, 27 and 28. All of these parts are intended to be diagrammatic only, with the exception of the plate, 19, which is here shown taking the initial forming which consists in turning up the edges to a radius approximately that of the finished pipe.

The next stage, indicated in end view by Fig. II and partially in section in Fig. VI, shows a means for further processing the plate, 19, towards a circular outline and consists in a grooved roller, 29, and a convex roller, 30, the grooved roller, 29, shown to be mounted on the shaft, 31, provided with bearings, 32 and 33, upon which is mounted the worm wheel, 34, driven by the worm, 35, mounted on the shaft, 36, which will receive power from a source not shown. The convex roller, 30, is mounted upon the shaft, 37, provided with bearings, 38 and 39, which are supported by the frame, 40, which likewise supports the bearings, 32, 33 and a bearing indicated by numeral, 41, for the shaft, 36.

Note should be here taken that the Figs. V and VI are not related to each other with regard to the elevation of the plate, 19, as the plate in position as shown in Fig. I will be relatively higher and approximately at the center line of the finished pipe.

The final stage of the processing of the pipe and means for its accomplishment delineated in Figs. III, IV, VII and VIII will now be taken up. The partially closed pipe, still designated by the numeral 19, is shown in section in Fig. VII as having a half round at the side which will be opposite the final position of the seam and having the edges bent to approximately the outline of the finished pipe, and as shown in section in Fig. VII it is about to enter the finishing process and through the unclosed side of the pipe as shown in Fig. VII projects a bracket, 42, supported on pedestals, 43 and 43a, and having attached thereto a beam, 44, in turn fastened to a bracket, 45, anchored on the frame of the third forming stage. Adjustably attached to the bracket, 42, at 42a, is the staff, 46, preferably made a part of the spindle, 47, of my floating mandrel. This combination of parts serves to anchor the spindle, 47, immovably against axial loads while permitting a slight lateral movement within desirable limits by reason of the flexibility of the staff, 46.

The designer will note that the axial load on the staff, 46, can never greatly exceed that required to overcome the compression strength of the spring, 60. Forming rollers, 48, 49, 50 and 51, are purposed to take the pipe, 19, as it appears as shown in section in Fig. VII and complete the circular outline.

It will be understood that the rollers, 48, 49, 50 and 51 are power driven as shown by the shafts, 51a, 50a, 49a and 48a, supported in bearings to which no numerical designation is given as it would add nothing to the clarity of the drawings; and the shaft, 50a is driven by the worm wheel, 50b, the shaft, 51a, being driven by the worm wheel, 51b, the shaft, 48a, driven by the worm wheel, 48b, the shaft, 49a, driven by the worm wheel, 49b, worms being provided as shown for all worm wheels and operative connections shown to the lay-shaft, 17, heretofore designated as a means for transmitting power from a source not shown, is thought to be sufficient disclosure as the particular arrangement of the forming rolls in this last or finishing stage may be varied widely according to means and methods well known in the art without in any degree modifying the principle of the invention now about to be described and disclosed for the first time.

Since, as heretofore stated, it is necessary in order to weld a seam by any of the rod-welding methods that a mandrel providing a backing for the weld be used, and since both a long, solid mandrel and a long, collapsible mandrel are impracticable for the reasons heretofore stated, I have used my new invention which I have called a floating mandrel. It consists of a tapered spindle, 47, properly supported as at 46, 42a, 42, 44 and 45, the support reaching through the unclosed edges of a pipe to be finished and welded, the center line of the spindle corresponding with the axis of the pipe.

On the spindle, 47, are mounted a plurality of sections, here shown to be four in number, and designated by the numerals, 55, 56, 57 and 58. These sections have an internal taper corresponding to the taper of the spindle, 47, and means such as the T-slots, 55a, 56a, 57a and 58a, adapted to contain the milled T's formed on the spindle 47, as shown in section in Fig. IV, serve to retain the sections in place while permitting axial movement of the sections with respect to the spindle, 47. Movement against the spring, 60, will decrease the overall diameter of the assembly of sections and a reverse movement under the influence of the spring, 60, will increase the diameter.

The outline of the assembled sections will therefore be tapered on the inside and straight cylindrical on the outside and the end nearest the pipe intake as shown at 57b and 55b will preferably be provided with a fillet. The top section, 55, will have embedded the customary well known and indispensable strip of copper or other weld resisting material, 55c, to form a backing for the weld.

All of the sections being mounted upon the spindle, 47, as indicated, will tend to be forced against the taper of the spindle, 47, to increase the diameter of the assembly by the compression spring, 60, which is mounted upon the extension, 61, and adjustably held in place by the collar, 62, and adjusted by the nut, 63, the sections being prevented from traveling too far by the shoulder, or stop means, 64, at the opposite end of the tapered spindle, 47.

When making a mandrel for the inside of a pipe and separate sections such as 55, 56, 57 and 58 will have to be provided for each diameter, the external cylindrical surface should be turned to the exact diameter required within close limits. It is of course necessary in order to perform a satisfactory weld that the mandrel shall fit very tightly inside of the pipe while it is being welded; that is, it shall exert a very considerable internal pressure; but the rugosity due to forming of the pipe, which will vary somewhat with the thickness of the plate, may be depended upon, generally, to supply the requisite extra plate thickness to provide the tightness required, and the spring, 60, should be adjusted to sufficient original compression so that taken in connection with and operating through the tapered portion of the spindle, 47, it will supply a substantial internal pressure on the pipe varying somewhat with the thickness of the plate and diameter of the pipe. This pressure may be easily found by experiment in any case and the adjustment for each variety of pipe marked on the mandrel. The spring, 60, may be changed when necessary.

It will be noted that this floating mandrel, owing to the long slim taper of the spindle, 47, which will ordinarily be less than one-half inch per foot in length, is not directly compressible by any means whatever and when the "bite" of the rollers, 48, 49, 50 and 51, and a supporting idler not heretofore mentioned but here given a designating numeral, 65, tends to pinch the pipe, 19, onto the mandrel and it is there welded, the sections will be carried forward in the direction in which the pipe is progressing, compressing the spring, 60, and the tapered spindle, 47, supported by the structures, 46, 42a, 42, 44 and 45, or their equivalents, will remain stationary; the sections, therefore, being carried forward on a tapered spindle will decrease the total outside diameter of the mandrel in proportion to the distance they are carried forward, compressing the spring, 60, while so doing. It is easy to see that as soon as the edges of the pipe, 19, now here designated as A and B, come together and touch, the pressure on the floating mandrel will be partially relieved and the spring, 60, will assert itself to maintain the floating mandrel as far up on the tapered spindle, 47, as the adjusted strength of the spring will warrant, with a corresponding internal pressure of the mandrel against the inner surface of the pipe. The action of this mandrel is automatic. Once it is set and adjusted for proper internal pressure and with proper adjustment of the spring, 60, the bearing surfaces between the sections and the spindle being kept well lubricated, the mandrel will be truly a floating mandrel and will, according to the degree of rugosity of the pipe, which it will largely correct, continue to move longitudinally backwards and forwards exactly as required by conditions, to provide a firm backing for a weld, relieve itself and the internal pressure when that becomes necessary and make possible a uniform product. It will be understood that an autogenous welding device such as the well known arc welding machine or any other well known device for autogenous rod-welding will be used to join the edges approximately at the point indicated by W in Figs. VIII and IX and by the arrow in Fig. III.

A ground wire, 70, is shown attached to the copper backing, 55c, and will of course be used and necessary when the welding is done by the electric arc. It will do no harm and need not be removed when the welding is done by means not requiring it.

It is well understood that rollers and sheaves for forming a plate into the circular outline of a pipe are well known and that, taken apart from my floating mandrel, nothing has been contributed to the art that was not already known. My floating mandrel is a new mechanical element. It is not a "pipe ball" and neither is the action of it analogous since the pipe ball does not have an axial movement and neither does it vary its diameter; and there is no other element in the pipe making art that will substitute for my mandrel.

"Floating mandrel" in this specification means a mandrel having an axial movement relative to the spindle thereof and under the influence of external friction that reduces the overall diameter of the mandrel, proportional to the movement and a reverse movement under the influence of a spring or equivalent that increases the overall diameter proportional to the reverse movement.

Having thus described my new machine in a manner that will permit those skilled in the art to which it appertains to make and use it, what I claim as new and desire to secure by Letters Patent, is—

1. A floating mandrel for a pipe welding machine comprising a plurality of sections, a tapered spindle upon which the sections are mounted, means for retaining the sections on the spindle, means for holding the spindle within a partially finished pipe, means effective for decreasing the external diameter of the assembled sections under the influence of external friction thereon and means opposing the action of the external friction and tending to maintain the external diameter.

2. A floating mandrel for a pipe welding machine comprising a plurality of sections, a tapered spindle upon which the sections are mounted, means for retaining the sections on the spindle, spring means tending to force the sections against the taper of the spindle to maintain the diameter of the mandrel, and means for anchoring the spindle against axial movement when held within a partially closed pipe section.

3. A floating mandrel for a pipe welding machine defined in part as a plurality of mandrel sections, a tapered spindle upon which the sections are mounted and movable axially in one direction to reduce the diameter of the mandrel under the influence of friction on the surfaces thereof, spring means tending to maintain the diameter of the mandrel by axial pressure on the sections against the taper of the spindle, means to limit the effect of the spring means and means to anchor the spindle within a partially finished pipe whereby said mandrel maintains a substantially uniform backing pressure under a seam.

4. A floating mandrel for a pipe machine defined in part as a plurality of sections, a tapered spindle upon which the sections are mounted, said sections being cylindrical in external outline and conforming to the spindle internally, means for retaining the parts in assembly including a stop means for one end of the spindle and spring means for the opposite end of said spindle, means for anchoring the spindle within a pipe to be closed and welded and means permitting automatic lengthwise movement of the sections relative to the spindle, whereby the mandrel is reduced to prevent seizure by movement in one direction and restored to maintain contact by movement in the other direction.

In testimony whereof I have affixed my signature this 30th day of September, 1931.

GEORGE F. McDOUGALL.